（12）United States Patent
Hraška et al.

(10) Patent No.: US 12,149,493 B1
(45) Date of Patent: Nov. 19, 2024

(54) AUTOMATIC POLL GENERATION BASED ON USER COMMUNICATIONS

(71) Applicant: Cisco Technology, Inc., San Jose, CA (US)

(72) Inventors: Peter Hraška, Bratislava (SK); Marek Šuppa, Jacovce (SK); Andrej Švec, Bratislava (SK); Samuel Sučík, Bratislava (SK); Daniel Skala, Groningen (NL); Jakub Tomiš, Bratislava (SK); Ján Podmajerský, Trenčín (SK)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/358,362

(22) Filed: Jul. 25, 2023

(51) Int. Cl.
*G06F 15/16* (2006.01)
*G06F 40/20* (2020.01)
*H04L 51/216* (2022.01)

(52) U.S. Cl.
CPC ............ *H04L 51/216* (2022.05); *G06F 40/20* (2020.01)

(58) Field of Classification Search
CPC .............................. H04L 51/216; G06F 40/20
See application file for complete search history.

(56) References Cited

U.S. PATENT DOCUMENTS

| | | | |
|---|---|---|---|
| 10,594,757 B1 * | 3/2020 | Shevchenko | G06F 17/18 |
| 2016/0036737 A1 * | 2/2016 | Atamel | G06F 16/9537 |
| | | | 715/752 |
| 2017/0063745 A1 * | 3/2017 | Banerjee | G06Q 30/0203 |
| 2019/0068477 A1 | 2/2019 | Faulkner | |
| 2019/0205381 A1 | 7/2019 | Raux et al. | |
| 2021/0012777 A1 * | 1/2021 | Liang | G06F 3/167 |
| 2021/0136019 A1 | 5/2021 | Price et al. | |
| 2021/0150545 A1 | 5/2021 | Wu et al. | |
| 2023/0068231 A1 | 3/2023 | Burd et al. | |

OTHER PUBLICATIONS

Felker N., "Automatic Polls in Group Chat Conversations", Technical Disclosure Commons, Nov. 19, 2017, pp. 1-7.

Lu Z., et al., "Engage the Public: Poll Question Generation for Social Media Posts", Proceedings of the 59th Annual Meeting of the Association for Computational Linguistics and the 11th International Joint Conference on Natural Language Processing, Aug. 2021, pp. 29-40.

(Continued)

*Primary Examiner* — Joseph R Maniwang
(74) *Attorney, Agent, or Firm* — Edell, Shapiro & Finnan, LLC

(57) ABSTRACT

A method, computer system, and computer program product are provided for automatically generating polls. A message of a plurality of messages is received corresponding to a conversation between a plurality of users. One or more candidate polls are generated using a natural language processing model and determining a poll type for each of the one or more candidate polls based on the message and a context of the conversation. It is determined that at least one candidate poll of the one or more candidate polls is relevant according to the context of the conversation. In response to determining that the at least one candidate poll is relevant, the poll of the poll type is generated based on the message for presentation to the plurality of users.

20 Claims, 7 Drawing Sheets

(56) References Cited

OTHER PUBLICATIONS

Polly: "Polly for HR Professionals", Educational Guides, Retrieved on May 17, 2023, pp. 1-13.

Prompt Injection, Learn Prompting: Your Guide to Communicating with AI, Retrieved on May 17, 2023, pp. 1-4.

Aicontentfy Team, "Using chatGPT for creating engaging andinteractive polls," https://aicontentfy.com/en/blog/chatgpt-for-creating-engaging-and-interactive-polls, May 11, 2023, 8 pages.

Openai, "Fine-tuning GPT-3 for generating questions," Community, Developer Forum, retrieved from https://community.openai.com/t/video-fine-tuning-gpt-3-for-generating-questions/11906, Jul. 25, 2023, 4 pages.

Openai, "Using openAI to create questions (not answer them)," API—OpenAI Developer Forum, retrieved from https://community.openai.com/t/using-openai-to-create-questions-not-answer-them/19457, Jul. 25, 2023, 3 pages.

Stova, "How to Leverage AI to Improve Personalization and Event Experiences," https://stova.io/how-to-leverage-ai-to-improve-event-experiences/, Jun. 15, 2021, 7 pages.

Golla, R., "Complete guide to generating Multiple Choice Questions automatically using AI," Questgen, https://blog.questgen.ai/complete-guide-to-generating-multiple-choice-questions-automatically-using-ai-ckxnbk4l1647361ks7wohnp8x4/, Dec. 26, 2021, 14 pages.

\* cited by examiner

AUTOMATIC POLL GENERATION BASED ON USER COMMUNICATIONS

TECHNICAL FIELD

The present disclosure relates generally to electronic communications, and more specifically, to automatically generating and presenting polls to users based on user communications.

BACKGROUND

In team collaboration settings, messaging clients such as teleconferencing systems, email systems, and other chat systems are commonly used to facilitate communication and discussions among team members. These collaboration tools can be designed to facilitate effective teamwork, communication, and project management within organizations by providing a digital platform for individuals and teams to collaborate, share information, and work together on tasks and projects. While collaboration tools enable users to exchange messages and share information, when a group is to make a decision, the process can become cumbersome due to the volume of messages and number of diverse opinions.

DETAILED DESCRIPTION

Overview

Figure 1:
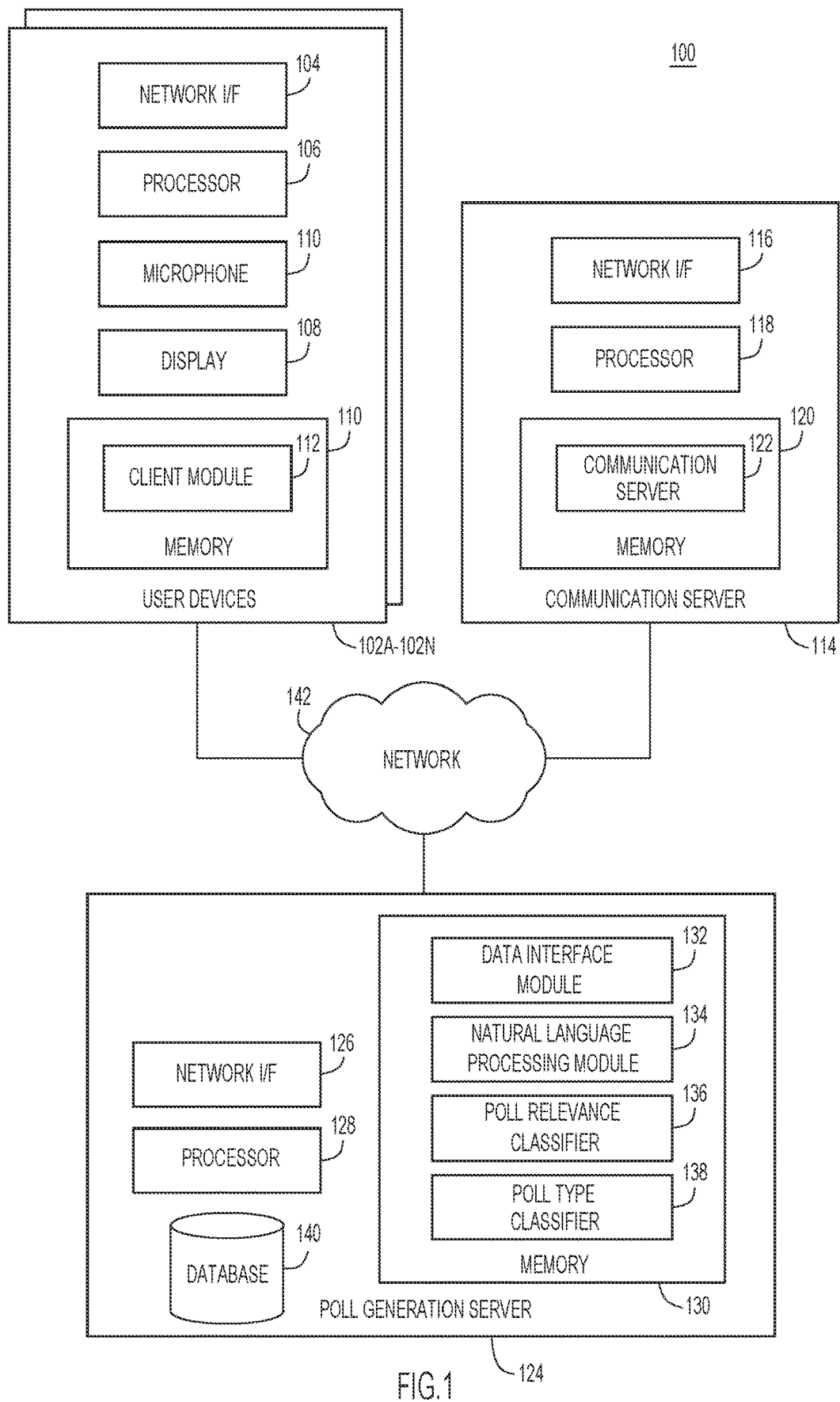
FIG. 1 is a block diagram of a computing environment for automatic poll generation and presentation based on user communications, according to an example embodiment.

According to one embodiment, techniques are provided for automatically generating polls. A message of a plurality of messages is received corresponding to a conversation between a plurality of users. One or more candidate polls are generated using a natural language processing model and determining a poll type for each of the one or more candidate polls based on the message and a context of the conversation. It is determined that at least one candidate poll of the one or more candidate polls is relevant according to the context of the conversation. In response to determining that the at least one candidate poll is relevant, a poll of the poll type is generated based on the message for presentation to the plurality of users.

Example Embodiments

Present embodiments relate to electronic communications, and more specifically, to automatically generating and presenting polls to users based on user communications. In the era of remote/hybrid work, electronic communication (e.g., chat messaging, e-mail, teleconferences, etc.) has become an increasingly important tool for coworkers to stay connected and collaborate in real-time. However, as the use of electronic communication has increased, it has become increasingly difficult to manage multiple conversation threads, leading to confusion and decreased productivity. In particular, when a group of users collaborates on a project, it can be difficult to determine how to make decisions when confronted with various options, especially when conversations span disparate communications platforms (e.g., some communications may be made via email, whereas others occur in a multi-user chat session).

To address this problem, the embodiments presented herein provide an improved approach to automatically generating and presenting polls to users in a manner that is based on conversation context. In particular, user messages from various platforms can be aggregated and polls can be generated based on the messages using a natural language processing model, such as a large language model (LLM). These polls can be generated in real-time for each message or it may be appreciated that the polls can be generated in advance based on past similar meetings of the same participant and can be vetted before presentation to a user via a machine learning classifier that determines whether a poll is actually relevant given the context of the multi-user communications. Polls of different types can be generated as well, and a poll of a given poll type may additionally be selected that is most relevant for presenting to users given the conversation context. Thus, present embodiments ensure that a poll is presented to users only when a poll would be relevant, and furthermore, present embodiments ensure that the poll is of an appropriate poll type.

Thus, present embodiments improve the technical field of electronic communication by automatically generating and presenting polls to collaborating users in order to improve their decision-making process. Whereas conventional approaches merely generate polls based on user requests or at inappropriate times, the embodiments presented herein ensure that the polls are only presented when relevant to a conversation, thus improving the efficiency of computing resource utilization by avoiding unnecessary poll generation. However, in some cases the poll may be prepared in advance (again, based on previous meeting data) as a meeting opener poll to collect user feedback which the facilitator can use to discuss the most relevant topics. Furthermore, present embodiments can collect user feedback to improve the accuracy of the machine learning models used herein over time, thus providing continuously-improving machine learning models that are specifically trained to perform operations relating to poll generation.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments, without departing from the spirit of this disclosure.

These features and advantages will become more fully apparent from the following drawings, description and appended claims, or may be learned by the practice of embodiments as set forth hereinafter.

Embodiments will now be described in detail with reference to the Figures. Reference is now made to FIG. 1. FIG. 1 is a block diagram in which a computing environment 100 is shown for automatic poll generation and presentation based on user communications, according to an example embodiment. As depicted, computing environment 100 includes a plurality of user devices 102A-102N, a communication server 114, and a poll generation server 124 that are in communication via a network 142. It is to be understood that the functional division among components have been chosen for purposes of explaining various embodiments and is not to be construed as a limiting example.

Regarding the various modules of computing environment 100 that are depicted in memories 110, 120, and 130, (e.g., client module 112, communication service 122, data interface module 132, natural language processing module 134, poll relevance classifier 136, and/or poll type classifier 138), these modules may each include one or more modules or units to perform various functions of the embodiments described below. It should be appreciated that each of these modules may be implemented by any combination of any quantity of software and/or hardware modules or units, and may reside within their respective memories (e.g., memory 110, memory 120, and/or memory 130) of their respective devices (e.g., user devices 102A-102N, communication server 114, poll generation server 124) for execution by a processor, such as processor 106, processor 118, and/or processor 128. Any given user device of user devices 102A-120N is referred to herein as user device 102.

User device 102 includes a network interface (I/F) 104, at least one processor (computer processor) 106, a display 108, and memory 110, which stores instructions for a client module 112. In various embodiments, user device 102 may include a rack-mounted server, laptop, desktop, smartphone, tablet, or any other programmable electronic device capable of executing computer readable program instructions. Network interface 104 enables components of user device 102 to send and receive data over a network, such as network 142.

In general, user device 102 may perform operations relating to user collaboration, such as presenting communications from other users and enabling users to send communications to one or more other users. Display 108 may include any electronic device capable of presenting information in a visual form. For example, display 108 may be a liquid crystal display (LCD), a cathode ray tube (CRT) display, a light-emitting diode (LED) display, an electronic ink display, and the like.

Client module 112 enables a user of user device 102 to engage in electronic communications with other individuals. In various embodiments, communication module 112 may include a telephony client (e.g., an audio-based communication client), an e-mail client, a chat client, a short messenger service (SMS) client, a teleconferencing client, and/or any other client for communicating with others. Client module 112 may present communications to a user via a graphical user interface that is displayed at display 108 of user device 102. Thus, a user may engage with client module 112 to read or listen to communications, and can respond to communications. Client module 112 may present alerts to a user of user devices 102A-102N to notify when a new communication is received. For example, client module 112 can present alerts regarding communications that include alerts when a communication is received and/or subsequent alerts to remind a user of a communication (e.g., an unread or unanswered communication). The alerts can include audio-based alerts, visual alerts presented by a graphical user interface, haptic feedback alerts, and any other form of alert that user device 102 is capable of generating in order to draw a user's attention. Thus, client module 112 may enable users to participate in group discussions using real-time or other communication techniques that provide timely delivery of communications and synchronization across all participants. In various embodiments, users can exchange text-based messages, multimedia content, and/or files within a group communication session.

Client module 112 may include logic for presenting polls to users in order to provide an environment for collaborative decision-making. In some embodiments, users can create polls with customizable options and set parameters such as duration, visibility, and voting restrictions. Client module 112 can provide a graphical user interface for users to browse and participate in active polls, view poll results in real-time, and cast their votes securely. The polls can be presented in-line with respect to a conversation history, and can include various poll types.

In various embodiments, the poll types can include an open-text entry poll type, a word cloud poll type, a ranking poll type, a rating poll and/or a multiple-choice poll type. An open-text entry poll type can include a poll in which a question or statement is presented to users, and users can freely enter a response. For example, a poll can prompt users regarding each user's opinion for the name of a new project, and users can freely input any desired project name. A word cloud may refer to a visual representation of text data where the size of each word corresponds to its frequency or importance within the given text. In the context of polling users, a word cloud poll may present various voting options to users in the form of text selections, circles or other shapes with text inside or overlayed, and the like; as users vote, the voting options that receive votes may increase in size relative to other voting options to indicate that those voting options are more popular. A word cloud may be used in cases when a single/short text answer is expected. A ranking poll type may present multiple choices to a user, who can vote by ranking the user's preference of options. For example, a user can assign a number (e.g., one, two, three, or four) to various options, with lower or higher numbers indicating an order of preference, or a user may drag-and-drop the voting options to arrange the options in a ranked order that reflects the user's preferences. A rating poll empowers users to submit a vote on a comprehensive scale ranging from 1 to 10 stars, or a selection of emojis. This can be useful, for instance, if one is looking for a swift feedback or a gauge the sentiment of the audience. A multiple-choice poll may include two choices (e.g., "true" and "false", "yes" and "no") or three or more choices (e.g., "A", "B", "C" and "D"), enabling the user to select an option (or in some embodiments, multiple options) to indicate the user's preference. The results of a poll can be presented via client module 112 to the participants in a real-time manner as votes are made, or after a threshold number of users have cast their votes, such as 50% of the participants, 75% of the participants, or 100% of the participants, etc.

Communication server 114 includes a network interface (I/F) 116, at least one processor 118, and memory 120, which stores instructions for a communication service 122. In various embodiments, communication server 114 may include a rack-mounted server, laptop, desktop, smartphone, tablet, or any other programmable electronic device capable of executing computer readable program instructions. Network interface 116 enables components of communication server 114 to send and receive data over a network, such as network 142. In general, communication server 114 facilitates the exchange of data between user devices 102A-102N, including collaboration session messages, short messaging service (SMS) messages, e-mail messages, teleconferencing data (including video and/or audio data), and the like.

Communication service 122 may host collaboration sessions or other forms of sending/receiving communications by facilitating the exchange of data between client devices (e.g., user devices 102A-102N) via their client modules (e.g., client module 112). The collaboration sessions may include video data (e.g., data gathered by a camera), audio data (e.g., data gathered by a microphone), and/or other forms of data (e.g., text, graphical data, slideshows, etc.). Thus, communication service 122 supports the exchange of e-mail messages, SMS messages, chat service messages, and/or any other form of communications that would be suitable for a collaborating group of users. Communication service 122 may receive polls from poll generation server 124, transmit the polls to user devices 102A-102N, receive user votes to determine poll results, and/or share results with users of user devices 102A-102N.

Poll generation server 124 includes a network interface (I/F) 126, at least one processor 128, and memory 130, which stores instructions for a data interface module 132, a natural language processing module 134, a poll relevance classifier 136, and a poll type classifier. In various embodiments, poll generation server 124 may include a rack-mounted server, laptop, desktop, smartphone, tablet, or any other programmable electronic device capable of executing computer readable program instructions. Network interface 126 enables components of poll generation server 124 to send and receive data over a network, such as network 142. In general, poll generation server 124 processes communications between multiple users in order to automatically generate polls for presentation to the users.

Data interface module 132 may obtain data that includes communications between users, metadata regarding communications, and any other data that is relevant to practice the embodiments presented herein. Additionally or alternatively, data interface module 132 may provide data to users devices 102A-102N and/or communication server 114, including poll data and/or other data. In some embodiments, data interface module 132 obtains or receives data that is processed by natural language processing module 134, poll relevance classifier 136, and/or poll type classifier 138. The data obtained or received by data interface module 132 can include communications between users, which can be obtained in a real-time manner, as well as metadata describing those communications, including identities of the users who authored each communication, the name or topic of a communication session, the participants of a communication session, and the like. Data interface module 132 may transmit data that comprises polls that are presented to users, which can be transmitted to communication server 114 and subsequently disseminated by communication server 114 to user devices 102A-102N, or which can be transmitted directly from data interface module 132 to user devices 102A-102N.

Natural language processing module 134 may include one or modules that can process as input user communications in order to output polls. In some embodiments, natural language processing module 134 may be specifically trained using a corpus of example user communications and corresponding polls. In various embodiments, the one or more models may include rule-based models, statistical models, machine learning models (e.g., naive Bayes classifiers, support vector machines, random forests, recurrent neural networks, etc.), transformer models, and the like. In some embodiments, natural language processing module 134 may include a general language model that is not specifically trained for poll generation, but which is capable of generating polls. For example, natural language processing module 134 may employ one or more large language models (LLMs) that is trained using self-supervised learning and/or semi-supervised learning. Natural language processing module 134 may generate one or more candidate polls for each communication in a real-time manner as the communications are exchanged between users, as will be discussed in further detail below with reference to FIGS. 3-5. Natural language processing module 134 may generate one poll per communication, or multiple polls per communication, including polls of various poll types (e.g., open-text entry polls, word cloud polls, ranking polls, rating polls, multiple-choice polls, etc.).

Natural language processing module 134 may receive, as input, communications between users that are obtained by data interface module 132, and may generate candidate polls that are provided to poll relevance classifier 136 and/or poll type classifier 138. Natural language processing module 134 may be trained to determine whether each communication merits a poll given the communication content and context of the communication session between users. Thus, natural language processing module 134 can determine whether a communication merits a poll, or a poll should not be presented to the users. For example, a communication for which relevant polls can be generated may include "suggest names for our new product feature," whereas a communication for which relevant polls may not be generated may include "the game last night was great, I loved the performance!". Additionally or alternatively, natural language processing module 134 may determine, based on a communication and/or the context of a communication (e.g., other communications proximal in time to the communication), which type of poll to generate. Natural language processing module 134 can be trained to determine whether a poll is relevant using examples of polls and corresponding communications, with each example poll being labeled as relevant or not relevant. Natural language processing module 134 can be trained to select one or more poll types for a communication similarly using a training corpus of communications that are each labeled with one or more poll types for polls that were generated using each example communication.

Once on or more candidate polls are generated for a given communication by natural language processing module 134, the one or more candidate polls are provided to poll relevance classifier 136 and/or poll type classifier 138 prior to presentation to users to ensure that the poll type is appropriate and that the poll is relevant to the communication.

Poll relevance classifier 136 may analyze candidate polls generated by natural language processing module 134 Poll relevance classifier 136 may include a machine learning model that is trained using existing poll questions that are labeled with relevance scores based on a number of votes received for each poll question. Thus, poll relevance classifier 136 can be trained to identify polls that are high in user engagement, and thus, likely to be relevant to a given communication. In one embodiment, the training corpus of example polls include polls labeled with a score based on the following equation:

$$\text{Score}(v) = 1 - \frac{1}{\log_2(v+2)} \quad \text{Equation (1)}$$

where v is the number of votes that a poll received. The function of equation (1) thus ensures that a score is zero for polls receiving zero votes, while the score approaches one for polls that receive increasingly more votes. Thus, poll relevance classifier 136 can process an input candidate poll to output a score that is indicative of whether the poll is relevant (e.g., whether the poll is likely to receive many user votes). In some embodiments, training data for poll relevance classifier 136 may include randomly generated strings, random questions scraped from network-accessible sources, and the like, which can be labeled with a low score or a score of zero to improve the accuracy of poll relevance classifier 136 in identifying inputs having poor relevancy.

Poll type classifier 138 may include one or more machine learning models that analyze candidate polls to determine whether the candidate polls are of an appropriate poll type given the communication upon which each poll is based. In order to train poll type classifier 138, a large corpus of examples of communications can be provided that are each labeled with a poll type, and poll type classifier 138 is trained to output how likely poll that is generated for a given communication is to be of a particular type. In various embodiments, poll type classifier 138 can output a poll type that is most likely to be relevant to a given communication, or poll type classifier 138 can provide an estimate of likelihood for every poll type that is supported by present embodiments.

Database 140 may include any non-volatile storage media known in the art. For example, database 140 can be implemented with a tape library, optical library, one or more independent hard disk drives, or multiple hard disk drives in a redundant array of independent disks (RAID). Similarly, data stored in database 140 may conform to any suitable storage architecture known in the art, such as a file, a relational database, an object-oriented database, and/or one or more tables. The data stored in database 140 may include one or more trained machine learning models (e.g., for natural language processing module 134, poll relevance classifier 136, and/or poll type classifier 138) training data for the machine learning models, user communications and corresponding metadata, results of polls, including votes for each option and/or number of votes overall, and the like.

Network 142 may include a local area network (LAN), a wide area network (WAN) such as the Internet, or a combination of the two, and includes wired, wireless, or fiber optic connections. In general, network 142 can be any combination of connections and protocols known in the art that will support communications between user devices 102A-102N, communication server 114, and/or poll generation server 124 via their respective network interfaces in accordance with the described embodiments.

Figure 2B:
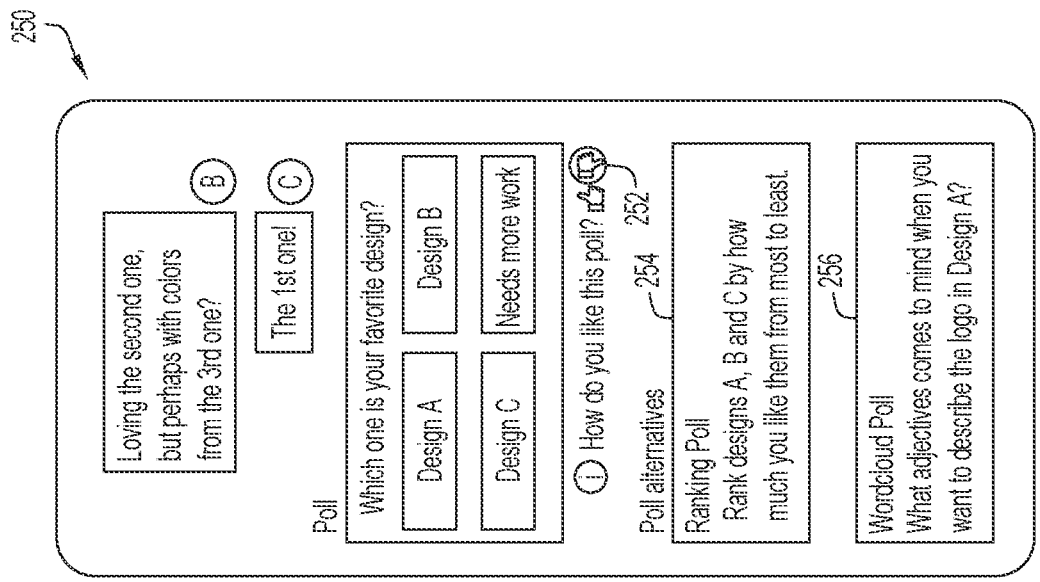
FIG. 2B is a diagram of a graphical user interface for receiving poll feedback from a user, according to an example embodiment.
Figure 2A:
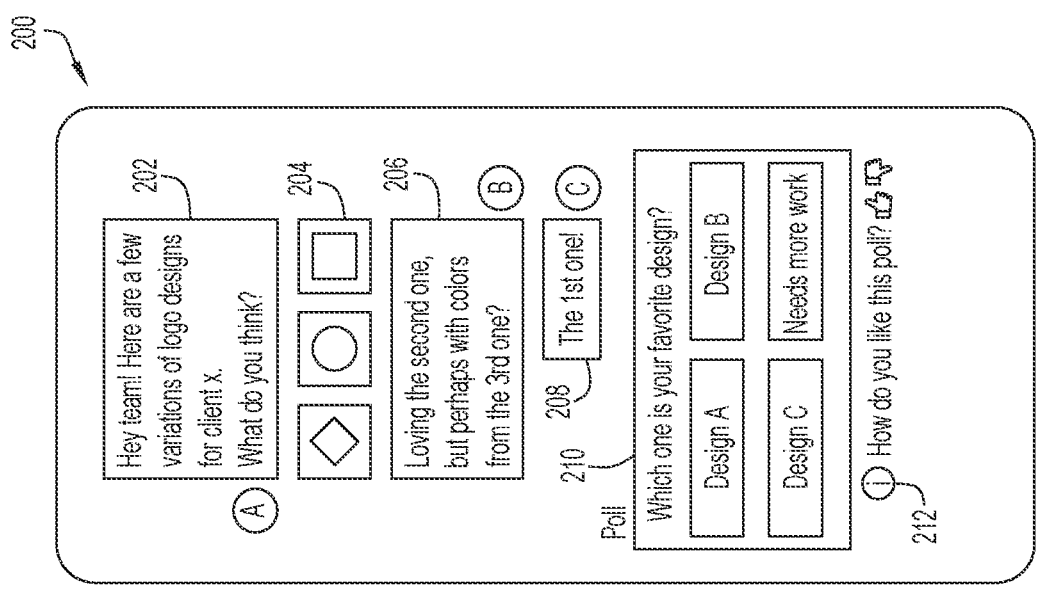
FIG. 2A is a diagram of a graphical user interface for presenting a poll to a user, according to an example embodiment.

With reference now to FIG. 2A, a diagram is provided of a graphical user interface 200 for presenting a poll to a user, according to an example embodiment. As depicted, graphical user interface 200 includes a multi-user chat history comprising communications 202, 204, 206, and 208, as well as a poll 210 that is inserted in-line with the chat history. A first user (e.g., user "A") has provided communication 202, upon which poll 210 is based, as well as several options in communication 204. A second user (e.g., user "B") and a third user (e.g., user "C") provide feedback in communications 206 and 208, respectively. Poll 210 may be generated in accordance with present embodiments, and may be based on communication 202 as well as additional context, which can include additional communications preceding communication 202 (not shown in the depicted example) as well as subsequent communications (e.g., communications 204, 206, and/or 208). Poll 210 may include a feedback user interface element 212 for receiving user feedback regarding the poll, such as whether the poll was proper or relevant.

FIG. 2B is a diagram of a graphical user interface 250 for receiving poll feedback from a user, according to an example embodiment. Graphical user interface 250 depicts a same chat history as graphical user interface 200 as well as additional elements after a user has provided feedback. The additional elements include a voting element 252, and alternative polls 254 and 256. As depicted, a user has indicated that the user does not like the provided poll at voting element 252. This selection by the user may cause alternative polls 254 and 256 to be presented to the user. The alternative polls may be other candidate polls that were generated in the same candidate poll pool as the original poll (e.g., poll 210), or alternative polls may be generated in an ad hoc manner when a user indicates that the original poll is not desired. In some embodiments, user feedback indicating that the user approves or disapproves of a poll may be added to a training corpus for the machine learning models provided herein in order to retrain one or more of the models to improve accuracy. In some embodiments, when a user selects an alternative poll (e.g., alternative poll 256), the selection may cause the alternative poll to replace, or be subsequently presented to, other users in the communication session. In a further embodiment, only a meeting host or administrator may have permission to replace the poll with an alternative poll.

Figure 3:
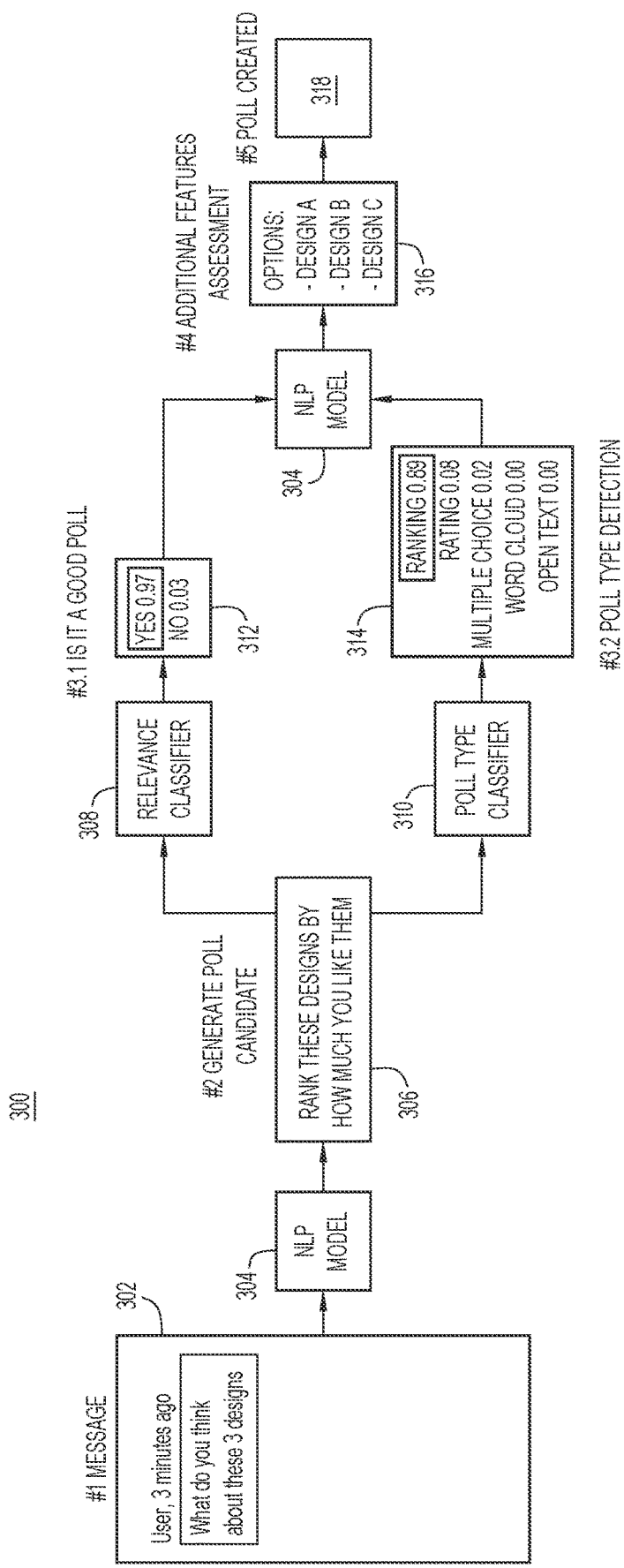
FIG. 3 is a flow diagram of a method of generating polls, according to an example embodiment.

FIG. 3 is a flow diagram of a method 300 of generating polls, according to an example embodiment. Initially, a communication 302 is obtained and processed by a natural language processing (NLP) model 304, which can include a large language model (LLM) or other language generation model. Communication 302 may be a user communication that is obtained from a conversation between multiple users across one or more platforms, and can be processed in real-time according to method 300.

NLP model 304 may be trained to generate a candidate poll 306 in response to NLP model 304 determining that a poll is relevant based on the content of communication 302. NLP model 304 may also be trained to determine which poll type is relevant for candidate poll 306. Thus, candidate poll 306 may be generated when NLP model 304 determines that it is above a threshold value of relevance to generate a candidate poll, and furthermore, the logic of NLP model 304 generates a poll of the most likely poll type given communication 302 as input.

Candidate poll 306 is processed by relevance classifier 308 and poll type classifier 310 to ensure that candidate poll 306 is relevant to communication 302 and of an appropriate poll type. The processing of relevance classifier 308 and poll type classifier 310 can be performed in any order or in parallel. Relevance classifier 308 may process candidate poll 306 to classify the relevance of the poll at operation 312. In particular, relevance classifier 308 may be trained using a corpus of examples of polls labeled with how many votes each poll received, which can be used as a measure of relevance by way of user engagement. In the depicted example, relevance classifier 308 determines that candidate poll 306 has a relevance score of 0.97 (or conversely, an irrelevance score of 0.03). In order to deem a candidate poll as relevant, the relevance score satisfies a threshold value (e.g., 0.5, 0.8, 0.9, etc.), which can be user-defined or a learned value.

Poll type classifier 310 may be trained using examples of user communications (e.g., questions or statements) that are labeled with poll types to indicate which poll is most relevant for each communication. Poll type classifier 310 can process candidate poll 306 to generate poll type scores 314 for each poll type. In the depicted embodiment, a ranking poll type has a score of 0.89, a rating poll type has a score of 0.08, a multiple-choice poll type has a score of 0.02, and a word cloud type and open text type both have scores of 0.00. In some embodiments, a poll type of a highest poll type score is selected. In some embodiments, if no poll type score satisfies a threshold value, then poll type classifier 310 may determine that no poll type is appropriate.

Thus, candidate poll 306 may satisfy the criteria of both relevance classifier 308 and poll type classifier 310. In some embodiments, if a score for one classifier satisfies a threshold value for that classifier but does not satisfy a threshold value for the other classifier, a poll may nevertheless be generated and presented to users. For example, if relevance classifier 308 determines that a relevance score for a candidate poll is above a particular threshold value (e.g., 0.90) that indicates that a poll is highly relevant, the poll may be generated despite poll type classifier 310 determining that no poll type satisfies its own threshold value. In such a case, the poll type that is selected may be whichever poll type receives the highest score.

Based on the determinations of relevance classifier 308 and/or poll type classifier 310, NLP model 304 may generate a poll 316 for presentation to users. The generated poll may be of the determined poll type, which can differ from that of candidate poll 306. However, in some embodiments, candidate poll 306 may be used as poll 316 that is presented to users. Poll 316 may be generated by NLP model 304 by assessing features in addition to communication 302, including any of the participants of the communication session, the identity of the author of communication 302, a name or description of a communication session (e.g., a topic of a teleconference), the context of the communications, and any other relevant factors. The context may include a number of messages within a threshold proximity to communication 302, which can include an order of messages (e.g., N messages before and/or after communication 302) and/or a time threshold (e.g., any messages falling within N minutes before and/or after communication 302). Poll 316 is then created and presented to users at operation 318.

Figure 4:
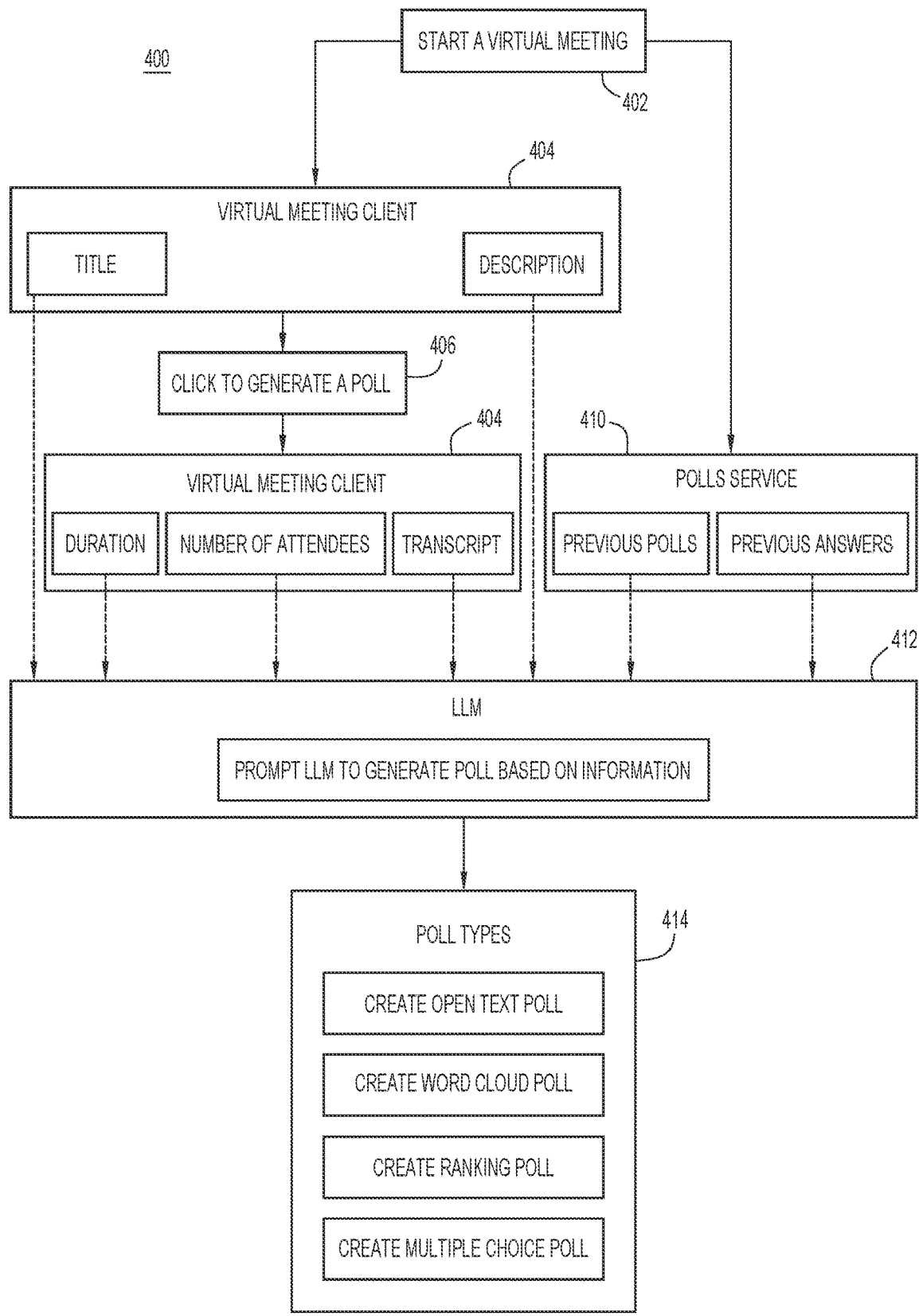
FIG. 4 is a flow diagram of a method of generating polls in a virtual meeting, according to an example embodiment.

FIG. 4 is a flow diagram of a method 400 of generating polls in a virtual meeting, according to an example embodiment. initially, at operation 402 a virtual meeting is started. A virtual meeting client 404 (e.g., any of user devices 102A-102N as depicted and described with reference to FIG. 1) may provide details relating to the virtual meeting, such as a title and/or description.

At operation 406, user input is provided indicating that a poll should be generated. However, in some embodiments, a natural language processing model may process communications of the virtual meeting in order to automatically determine that a poll should be generated. In some embodiments, a transcript of audio dialogue during the virtual meeting is generated using speech-to-text logic, which can generate the transcript in real-time or near-real-time as audio is received and processed. In other embodiments, gesture recognition during virtual video meeting can be used to detect the emotions and suggest some rating poll if confusion is detected.

A natural language processing model (e.g., an LLM) 412 may generate a poll using inputs from virtual meeting client 404 and/or a polls service 410. In addition to a virtual meeting title and/or description, virtual meeting client 404 may provide a meeting duration (or elapsed time thus far), a number of attendees, and/or a meeting transcript to natural language processing model 412. Polls service 410 may include a database of previous example polls that can be provided to natural language processing model 412 along with corresponding answers to each poll. Thus, natural language processing model 412 may generate one or more polls of various poll types 414, such as an open-text poll, a word cloud poll, a ranking poll, a rating poll and/or a multiple-choice poll. In the case that multiple polls are generated, a trained machine learning model (e.g., natural language processing model 412 or a classifier as disclosed herein) may select a poll of a particular poll type, or a user may select a poll of a given poll type, for presentation to other users during the virtual meeting. Method 400 may be executed for each new communication in a virtual meeting to ensure that when a poll is appropriate given a communication, the poll may be automatically generated and presented to the users.

Figure 5:
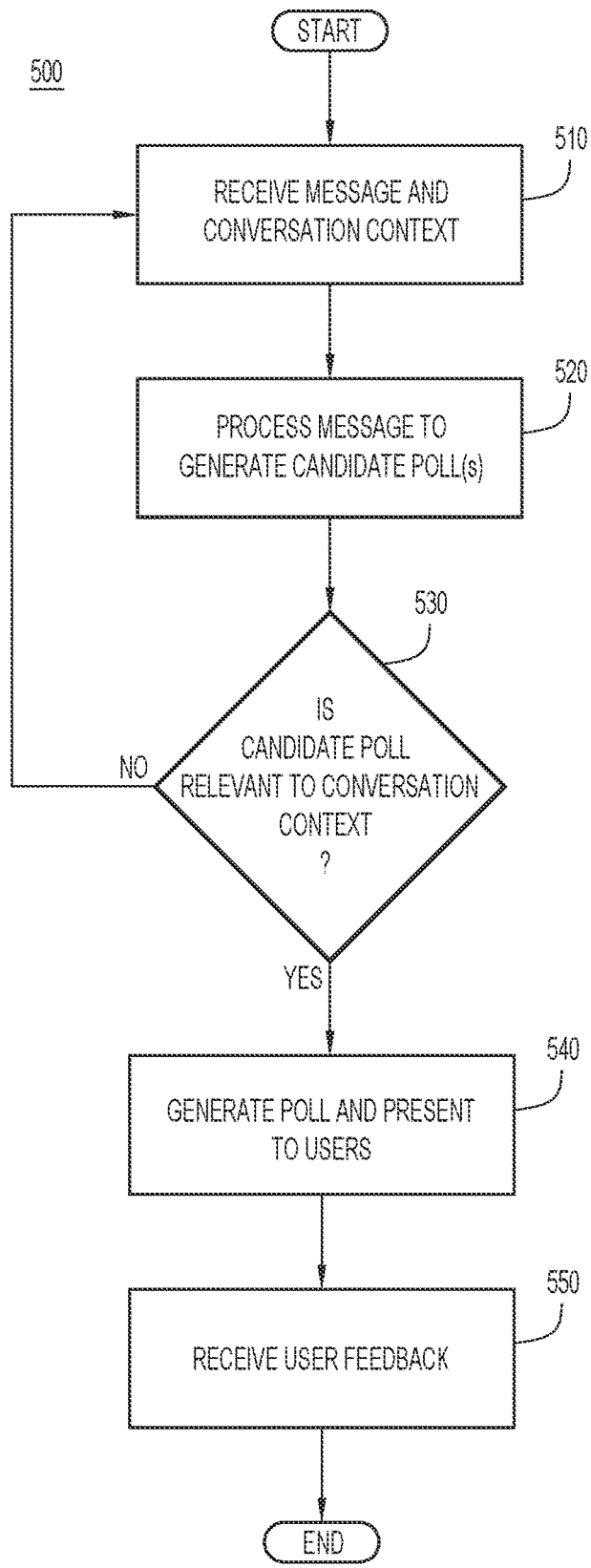
FIG. 5 is a flow chart of a method of processing user messages to generate and present polls, according to an example embodiment.

FIG. 5 is a flow chart of a method 500 of processing user messages to generate and present polls, according to an example embodiment.

A user message and a conversation context are received at operation 510. The message may be a communication that is gathered from one or more communication platforms or services, including a teleconferencing application, email, SMS messaging, and the like. The context may include messages related to the user message, including a portion of an overall conversation (e.g., messages within a certain time range of the user message and/or a number of messages preceding and/or following the user message). In some embodiments, the conversation context can be gathered from any of the one or more communication platforms or services, and can be intelligently gathered based on common identities of conversation participants. For example, if a group of users are participating in a communication session, then the context may include emails that the author of the user message has received from the other participants, The message is processed to generated one or more candidate polls at operation 520. The message may be processed by a language generation model, which can be a machine learning model or other natural language processing model such as an LLM. In some embodiments, one candidate poll is generated, whereas in other embodiments, multiple candidate polls may be generated. Moreover, the candidate poll(s) can be of various poll types, which can be selected by the language generation model based on input (e.g., the message and/or conversation context).

Operation 530 determines whether a candidate poll is relevant to the conversation context. A relevance classifier may be employed to process each of the one or more candidate polls to ensure that a poll is relevant. Additionally, a poll type classifier may be employed to determine that a poll is of an appropriate poll type given the user message and/or the conversation context.

If the candidate poll is relevant, then a poll is generated and presented to users at operation 540. The poll may be the candidate poll, or the language generation model may generate a new poll based on the user message and other features (e.g., conversation context, metadata associated with the user message and/or conversation context, etc.). The options (i.e., the possible responses) for each poll may be obtained by processing the conversation context and/or the user message itself. The poll may be presented to users in a user interface, including a separate ad hoc user interface (e.g., a "pop-up") that is presented to users. In some embodiments, the poll may be emailed or otherwise messaged to users, and in other embodiments, the poll may be presented in-line with the same user interface that was used to display the user message to the other users.

User feedback is received at operation 550. User feedback may include votes, the results of which can be shared with any or all of the users. Additionally, the user feedback can include indications from one or more users regarding the relevance of the poll or other user feedback, such as additional poll options that were not included in the poll. The user feedback may then be used to retrain any machine learning models involved in method 500 in order to improve the accuracy of poll generation over time.

Figure 6:
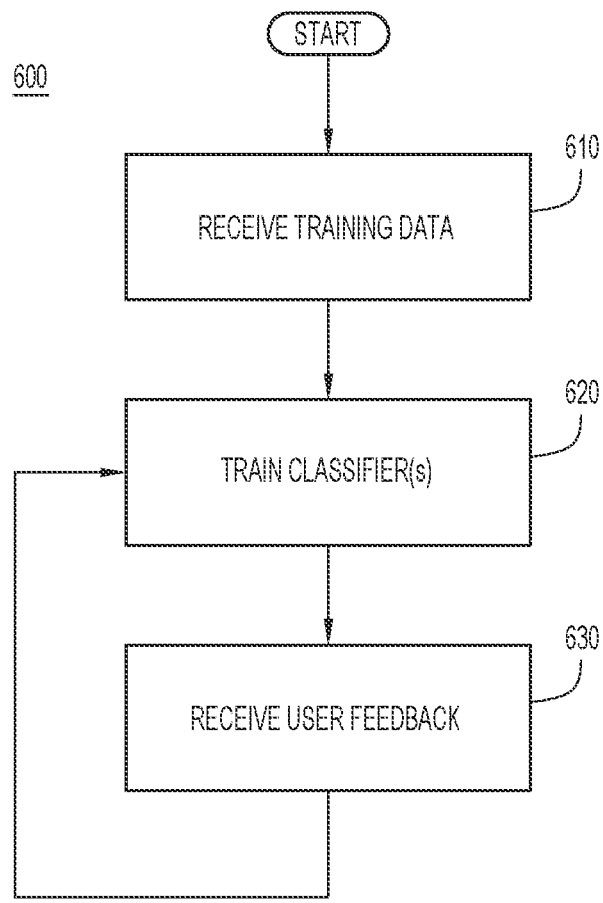
FIG. 6 is a flow chart of a method of training a machine learning classifier, according to an example embodiment.

FIG. 6 is a flow chart of a method 600 of training a machine learning classifier, according to an example embodiment. In various embodiments, the machine learning classifier may include a poll relevance classifier and/or a poll type classifier.

Training data is received at operation 610. For a poll relevance classifier, the training data may include examples of polls that are labeled with number of votes received, which can be a score that is a function of vote received, a raw count of votes received, or a percentage of voting participants vs. overall count of participants. For a poll type classifier, the training data may include examples of user messages and/or conversation contexts that are labeled with regard to poll type for polls generated based on those user messages.

The classifier(s) is/are trained at operation 620. The classifier(s) may be trained using the training data until a desired level of accuracy is reached. Some of the training data may be reserved as testing data in order to measure accuracy. Then, the classifier(s) may be employed in accordance with present embodiments to automate poll generation.

User feedback is received at operation 630. When a poll is presented to a user, the user may provide feedback in the form of an indication of whether or not the poll was actually relevant. Additionally or alternatively, the user feedback may include suggestions of additional poll options that should be included in the poll. User feedback may also include a participation metric (e.g., number or percentage of voting users) based on the number of users who responded to the poll. This user feedback can be used to expand the training data used in either training set at operation 620, and the classifier(s) may be retrained to continuously improve in accuracy over time.

Figure 7:
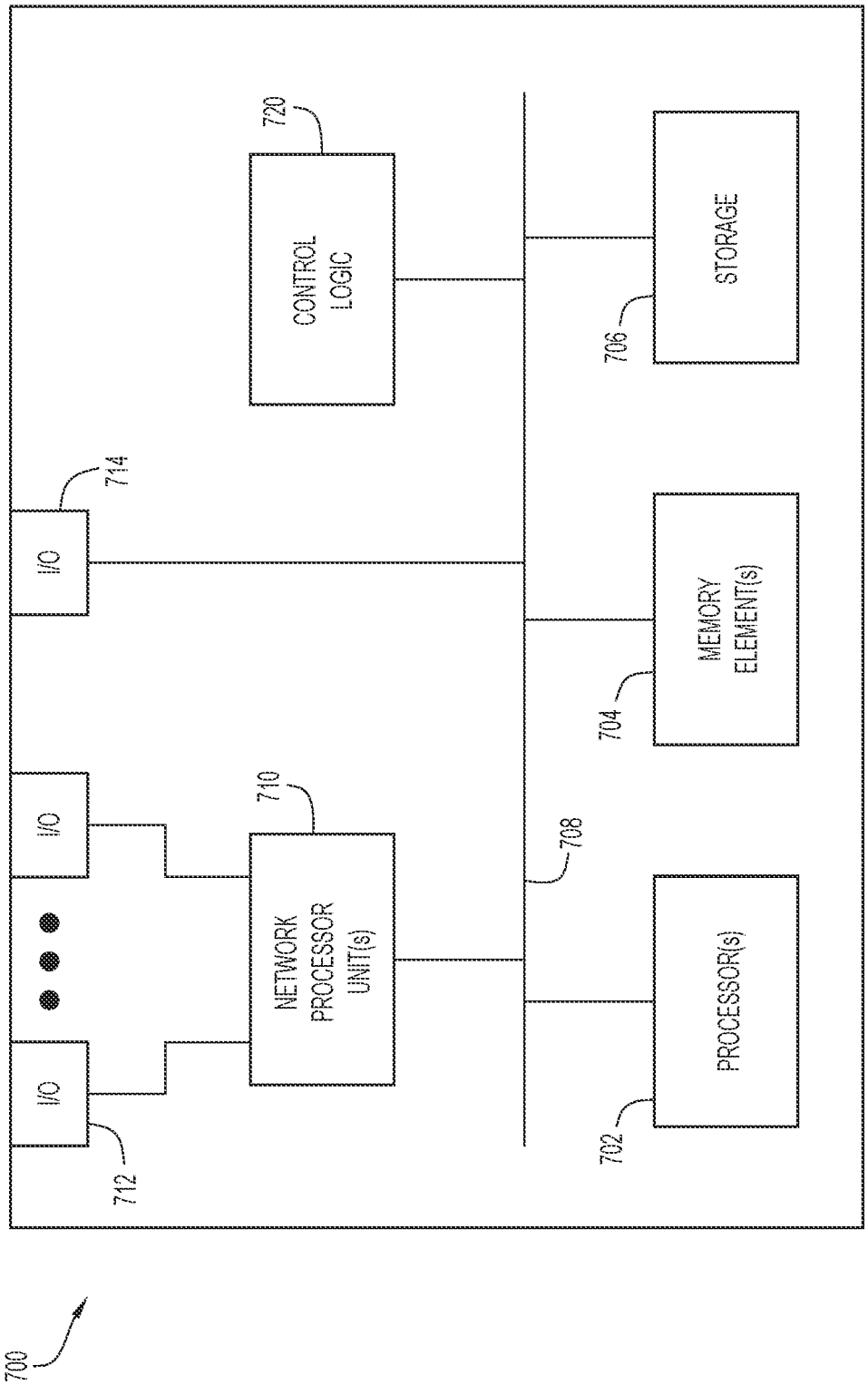
FIG. 7 is a block diagram of a device that may be configured to perform operations to generate and present polls based on user communications, as presented herein.

Referring now to FIG. 7, FIG. 7 illustrates a hardware block diagram of a computing device 700 that may perform functions associated with operations discussed herein in connection with the techniques depicted in FIGS. 1-6. In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O 714, and 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/ antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O 714 allow for input and output of data and/or information with other entities that may be connected to computing device 700. For example, I/O 714 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the spirit of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: receiving a message of a plurality of messages corresponding to a conversation between a plurality of users; generating one or more candidate polls using a natural language model and determining a poll type for each of the one or more candidate polls based on the message and a context of the conversation; determining that at least one candidate poll of the one or more candidate polls is relevant according to the context of the conversation; and in response to determining that the at least one candidate poll is relevant, generating a poll of the poll type based on the message for presentation to the plurality of users.

In some aspects, the techniques described herein relate to a method, wherein the plurality of messages are obtained from one or more sources selected from a group consisting of: an email message, a short messaging service message, a chat message, and text generated based on an audio conversation.

In some aspects, the techniques described herein relate to a method, wherein the context includes a portion of the conversation that corresponds to a selected time window within a time of the message in the conversation.

In some aspects, the techniques described herein relate to a method, wherein the poll type of the poll is selected from a group consisting of: an open-text entry poll, a word cloud poll, a ranking poll, a rating poll and/or a multiple-choice poll.

In some aspects, the techniques described herein relate to a method, wherein the poll is further generated based on one or more selected from a group consisting of: a title or topic of the conversation, an identity of one or more of the plurality of users, and previous polls and corresponding options.

In some aspects, the techniques described herein relate to a method, wherein determining the poll type is based on a poll type classifier that is trained using a corpus that includes example polls and corresponding messages used to generate each example poll.

In some aspects, the techniques described herein relate to a method, wherein determining that at least one candidate poll is relevant is based on a poll relevance classifier that is trained using examples of previous polls that are each labeled with a number of received votes.

In some aspects, the techniques described herein relate to a method, wherein one or more of the plurality of users manually provides one or more additional options to the poll, and wherein the one or more additional options are used to retrain the natural language processing model.

In some aspects, the techniques described herein relate to a system including: one or more computer processors; one or more computer readable storage media; and program instructions stored on the one or more computer readable storage media for execution by at least one of the one or more computer processors, the program instructions including instructions to: receive a message of a plurality of messages corresponding to a conversation between a plurality of users; generate one or more candidate polls using a natural language model and determining a poll type for each of the one or more candidate polls based on the message and a context of the conversation; determine that at least one candidate poll of the one or more candidate polls is relevant according to the context of the conversation; and in response to determining that the at least one candidate poll is relevant, generate a poll of the poll type based on the message for presentation to the plurality of users.

In some aspects, the techniques described herein relate to a system, wherein the plurality of messages are obtained from one or more sources selected from a group consisting of: an email message, a short messaging service message, a chat message, and text generated based on an audio conversation.

In some aspects, the techniques described herein relate to a system, wherein the context includes a portion of the conversation that corresponds to a selected time window within a time of the message in the conversation.

In some aspects, the techniques described herein relate to a system, wherein the poll type of the poll is selected from a group consisting of: an open-text entry poll, a word cloud poll, a ranking poll, a rating poll and/or a multiple-choice poll.

In some aspects, the techniques described herein relate to a system, wherein the poll is further generated based on one or more selected from a group consisting of: a title or topic of the conversation, an identity of one or more of the plurality of users, and previous polls and corresponding options.

In some aspects, the techniques described herein relate to a system, wherein determining the poll type is based on a poll type classifier that is trained using a corpus that includes example polls and corresponding messages used to generate each example poll.

In some aspects, the techniques described herein relate to a system, wherein determining that at least one candidate poll is relevant is based on a poll relevance classifier that is trained using examples of previous polls that are each labeled with a number of received votes.

In some aspects, the techniques described herein relate to a system, wherein one or more of the plurality of users manually provides one or more additional options to the poll, and wherein the one or more additional options are used to retrain the natural language processing model.

In some aspects, the techniques described herein relate to one or more non-transitory computer readable storage media having program instructions embodied therewith, the program instructions executable by a computer to cause the computer to perform operations including: receive a message of a plurality of messages corresponding to a conversation between a plurality of users; generate one or more candidate polls using a natural language model and determining a poll type for each of the one or more candidate polls based on the message and a context of the conversation; determine that at least one candidate poll of the one or more candidate polls is relevant according to the context of the conversation; and in response to determining that the at least one candidate poll is relevant, generate a poll of the poll type based on the message for presentation to the plurality of users.

In some aspects, the techniques described herein relate to one or more non-transitory computer readable storage media, wherein the plurality of messages are obtained from one or more sources selected from a group consisting of: an email message, a short messaging service message, a chat message, and text generated based on an audio conversation.

In some aspects, the techniques described herein relate to one or more non-transitory computer readable storage media, wherein the context includes a portion of the conversation that corresponds to a selected time window within a time of the message in the conversation.

In some aspects, the techniques described herein relate to one or more non-transitory computer readable storage media, wherein the poll type of the poll is selected from a group consisting of: an open-text entry poll, a word cloud poll, a ranking poll, a rating poll and/or a multiple-choice poll.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving a message of a plurality of messages corresponding to a conversation between a plurality of users;
   generating a plurality of candidate polls using a natural language processing model and determining a poll type for each candidate poll of the plurality of candidate polls based on the message and a context of the conversation;
   determining that at least one candidate poll of the plurality of candidate polls is relevant according to the context of the conversation and based on the poll type; and
   in response to determining that the at least one candidate poll is relevant, generating a poll of the poll type based on the message for presentation to the plurality of users.

2. The method of claim 1, wherein the plurality of messages are obtained from one or more sources selected from a group consisting of: an email message, a short messaging service message, a chat message, and text generated based on an audio conversation.

3. The method of claim 1, wherein the context comprises a portion of the conversation that corresponds to a selected time window within a time of the message in the conversation.

4. The method of claim 1, wherein the poll type of the poll is selected from a group consisting of: an open-text entry poll, a word cloud poll, a ranking poll, a rating poll and a multiple-choice poll.

5. The method of claim 1, wherein the poll is further generated based on one or more selected from a group consisting of: a title or topic of the conversation, an identity of one or more of the plurality of users, and previous polls and corresponding options.

6. The method of claim 1, wherein determining the poll type is based on a poll type classifier that is trained using a corpus that includes example polls and corresponding messages used to generate each example poll.

7. The method of claim 1, wherein determining that the at least one candidate poll is relevant is based on a poll relevance classifier that is trained using examples of previous polls that are each labeled with a number of received votes.

8. The method of claim 1, wherein one or more of the plurality of users manually provides one or more additional options to the poll, and wherein the one or more additional options are used to retrain the natural language processing model.

9. A system comprising:
one or more computer processors;
one or more computer readable storage media; and
program instructions stored on the one or more computer readable storage media for execution by at least one of the one or more computer processors, the program instructions comprising instructions to:
receive a message of a plurality of messages corresponding to a conversation between a plurality of users;
generate a plurality of candidate polls using a natural language processing model and determining a poll type for each candidate poll of the plurality of candidate polls based on the message and a context of the conversation;
determine that at least one candidate poll of the plurality of candidate polls is relevant according to the context of the conversation and based on the poll type; and
in response to determining that the at least one candidate poll is relevant, generate a poll of the poll type based on the message for presentation to the plurality of users.

10. The system of claim 9, wherein the plurality of messages are obtained from one or more sources selected from a group consisting of: an email message, a short messaging service message, a chat message, and text generated based on an audio conversation.

11. The system of claim 9, wherein the context comprises a portion of the conversation that corresponds to a selected time window within a time of the message in the conversation.

12. The system of claim 9, wherein the poll type of the poll is selected from a group consisting of: an open-text entry poll, a word cloud poll, a ranking poll, a rating poll and a multiple-choice poll.

13. The system of claim 9, wherein the poll is further generated based on one or more selected from a group consisting of: a title or topic of the conversation, an identity of one or more of the plurality of users, and previous polls and corresponding options.

14. The system of claim 9, wherein determining the poll type is based on a poll type classifier that is trained using a corpus that includes example polls and corresponding messages used to generate each example poll.

15. The system of claim 9, wherein determining that the at least one candidate poll is relevant is based on a poll relevance classifier that is trained using examples of previous polls that are each labeled with a number of received votes.

16. The system of claim 9, wherein one or more of the plurality of users manually provides one or more additional options to the poll, and wherein the one or more additional options are used to retrain the natural language processing model.

17. One or more non-transitory computer readable storage media having program instructions embodied therewith, the program instructions executable by a computer to cause the computer to perform operations including:
receive a message of a plurality of messages corresponding to a conversation between a plurality of users;
generate a plurality of candidate polls using a natural language processing model and determining a poll type for each candidate poll of the plurality of candidate polls based on the message and a context of the conversation;
determine that at least one candidate poll of the plurality of candidate polls is relevant according to the context of the conversation and based on the poll type; and
in response to determining that the at least one candidate poll is relevant, generate a poll of the poll type based on the message for presentation to the plurality of users.

18. The one or more non-transitory computer readable storage media of claim 17, wherein the plurality of messages are obtained from one or more sources selected from a group consisting of: an email message, a short messaging service message, a chat message, and text generated based on an audio conversation.

19. The one or more non-transitory computer readable storage media of claim 17, wherein the context comprises a portion of the conversation that corresponds to a selected time window within a time of the message in the conversation.

20. The one or more non-transitory computer readable storage media of claim 17, wherein the poll type of the poll is selected from a group consisting of: an open-text entry poll, a word cloud poll, a ranking poll, a rating poll and a multiple-choice poll.

\* \* \* \* \*